United States Patent [19]

Brinker et al.

[11] Patent Number: 5,025,919

[45] Date of Patent: Jun. 25, 1991

[54] PORTABLE DIRECTORY AND NOTE PAD TRAY

[75] Inventors: Barry Brinker; John E. Busse, both of Cincinnati, Ohio

[73] Assignee: Totes', Incorporated, Loveland, Ohio

[21] Appl. No.: 429,405

[22] Filed: Oct. 31, 1989

[51] Int. Cl.[5] .................... B60R 7/00

[52] U.S. Cl. .................... 206/214; 40/389; 40/442; 206/224; 206/815; 224/277; 224/42.45 R; 248/206.2; 281/15.1; 281/51; 362/99

[58] Field of Search .................... 40/372, 373, 388–390; 206/38, 39, 214, 224, 232, 371, 815; 224/42.45 R, 277, 281, 282; 248/205.7, 205.8, 206.2, 206.3, 311.2, 314; 281/15.1, 51; 283/36; 362/83.3, 98, 99, 253; 402/4, 70, 73, 502

[56] References Cited

U.S. PATENT DOCUMENTS

| | | | |
|---|---|---|---|
| 1,180,460 | 4/1916 | Whitney et al. | 281/51 |
| 2,141,761 | 12/1938 | Pollock | 281/51 |
| 2,575,482 | 11/1951 | Berger | 40/389 |
| 2,926,879 | 3/1960 | Dietrich | 248/311.2 |
| 2,998,509 | 8/1961 | Conradt | 362/99 |
| 3,232,685 | 2/1966 | Wilstein et al. | 362/99 |
| 3,949,917 | 4/1976 | Mann . | |
| 3,987,565 | 10/1976 | Mori | 40/389 |
| 4,290,093 | 9/1981 | Thompson et al. | 362/98 |
| 4,363,081 | 12/1982 | Wilbur | 40/442 |
| 4,570,793 | 2/1986 | O'Neil et al. | 206/214 |
| 4,619,386 | 10/1986 | Richardson | 224/277 |

FOREIGN PATENT DOCUMENTS

| | | | |
|---|---|---|---|
| 191497 | 8/1986 | European Pat. Off. . | |
| 0012527 | of 1902 | United Kingdom | 206/214 |
| 0162447 | 5/1921 | United Kingdom | 362/99 |
| 194101 | 3/1923 | United Kingdom . | |
| 369760 | 3/1932 | United Kingdom . | |
| 435211 | 9/1935 | United Kingdom . | |
| 2142278A | 1/1985 | United Kingdom . | |

*Primary Examiner*—Jimmy G. Foster

*Attorney, Agent, or Firm*—Wood, Herron & Evans

[57] ABSTRACT

A portable directory and note pad tray with several features. A first feature is a directory with a cover movable between open and closed positions that activates a light bulb circuit for lighting the directory cards when the cover is opened and deactivates the circuit for turning out the light bulb when the cover is closed. A second feature is a novel slide track, and slide arm structure by which the directory and tray are mountable to and de-mountable from a desired surface to present an optimum mounting angle for that surface. A third feature is a note pad tray with a novel base that includes a first finger gap in one of the tray's upstanding walls to allow individual sheets of a note pad to be easily removed from the tray, and a pencil recess defined in the tray with a magnetically attachable pencil that cooperates with a second finger gap in one of the tray's walls to allow easy removal of the pencil.

21 Claims, 3 Drawing Sheets

PORTABLE DIRECTORY AND NOTE PAD TRAY

This invention relates to name directories and note pad trays. More particularly, this invention relates to portable type name directories and note pad trays.

Name directories per se are, of course, very well known to the prior art. A name directory (used to hold, for example, a number of different names, telephone numbers and addresses) is used in business offices, as well as in residential homes, as a personalized telephone directory that may be kept close to the user's telephone. One basic type name directory known to the prior art includes a directory case with a series of directory cards that are alphabetized from A to Z, a case cover with a finger selector knob being provided to select that alphabetical letter card desired by the user. Document trays are also well known to the prior art. Such document trays as, for example, in/out trays used in business offices, are structured to hold many separate or individual documents. Also known to the prior art are note pad holders structured to hold note pads on which the user can write personalized messages to himself or herself.

Telephones for use in vehicles have recently become commonly available to the retail consumer. These vehicle telephones, which are hereinafter referred to as car telephones, are often used in the automobiles of business people, e.g., salesmen, who spend a good deal of their time on the road during their business day. One of the problems with car telephones, as to outgoing calls made by the car's driver, is that of finding the telephone number of the person the driver desires to call. Another of the problems associated with car telephones, as to both outgoing and incoming calls, is that of having a message pad or note pad that is readily accessible and on which messages may be written.

Accordingly, it has been an objective of this invention to provide a portable directory in combination with a note pad tray which is readily adaptable for selected mounting and de-mounting from a desired surface in a vehicle's interior adjacent the driver's seat, which is readily disassemblable from the connector by which it is mounted to the desired surface so the directory and tray can be carried in the owner's briefcase between vehicle and office, in which the directory is provided with a light source that is automatically activated to illuminate the directory cards when the directory cover is opened, and in which a note pad tray is provided which permits individual sheets of the pad, as well as a pencil integrally carried with the tray, to be easily removed therefrom for use.

Other objectives and advantages of the invention will be more apparent from the following detailed description taken in conjunction with the drawings in which.

Figure 1:
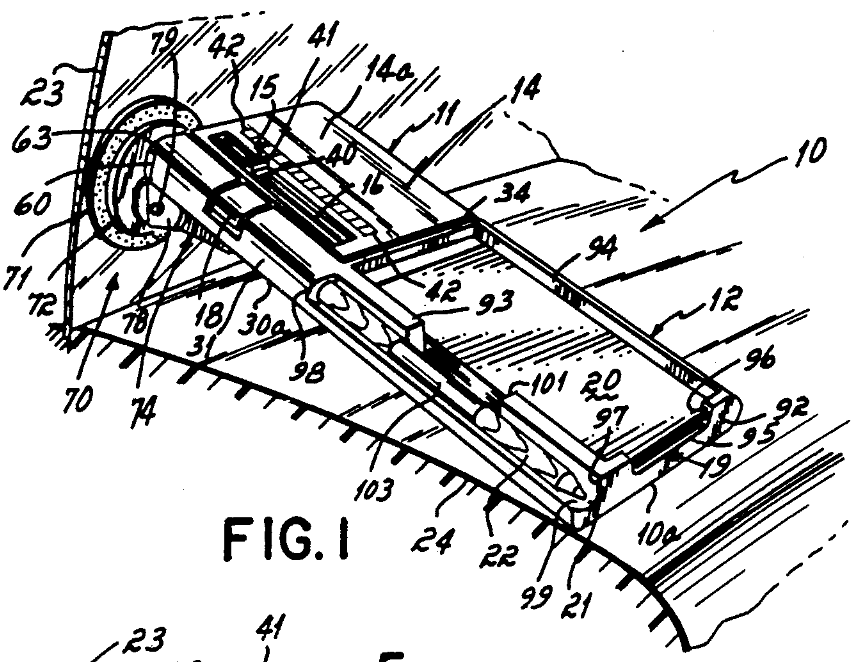
FIG. 1 is a perspective view illustrating a portable directory and note pad tray in accord with the principles of this invention, the device being mounted on the windshield in a vehicle's interior.

A portable directory and note pad tray 10 in accord with the principles of this invention is illustrated in FIG. 1. The device includes a portable directory 11 and a note pad tray 12 all joined together in one rigid structure.

Figure 2:
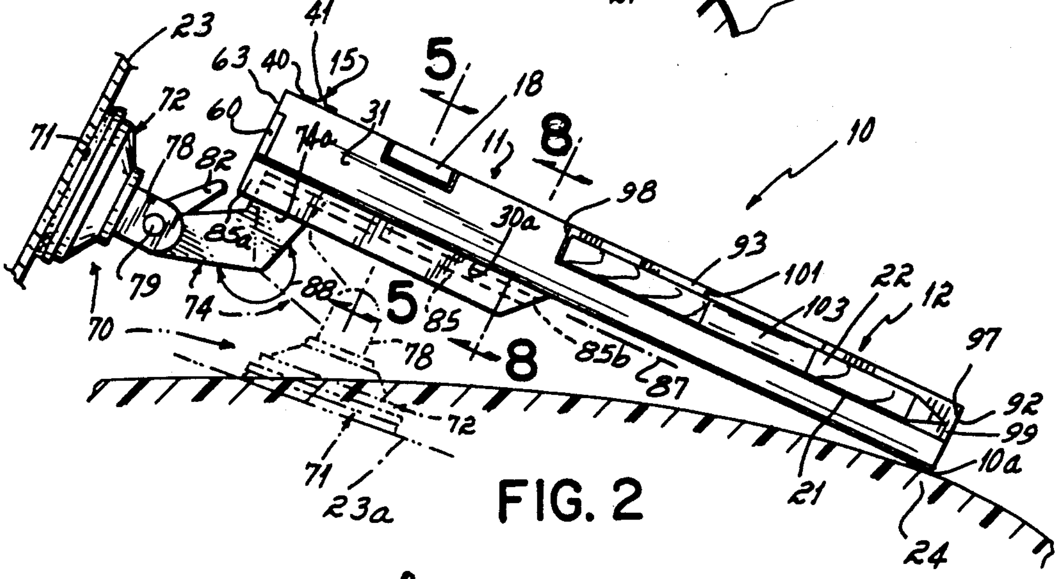
FIG. 2 is a side elevation view illustrating the directory and tray in the use position shown in FIG. 1.

The directory 11 includes a directory case 13 with a cover 14 movable between open and closed positions. The directory case 13 also includes an alphabet letter indicator and selector mechanism 15 slideable in track 16 to select the directory card 17 desired for use. A cover latch button 18 is depressable to open the directory cover 14 into the FIG. 6 position. The note pad tray 12 basically includes a pad base 19 sized to receive a note pad 20 of plural pages and a pencil recess 21 along one side edge of the pad recess sized to receive a pencil 22. The directory 11 and tray 12 which, as noted, are integral with one another as particularly illustrated in FIGS. 1 and 2, are mountable to and demountable from a desired surface, e.g., a vehicle windshield 23 above a vehicle dashboard 24.

Figure 4:
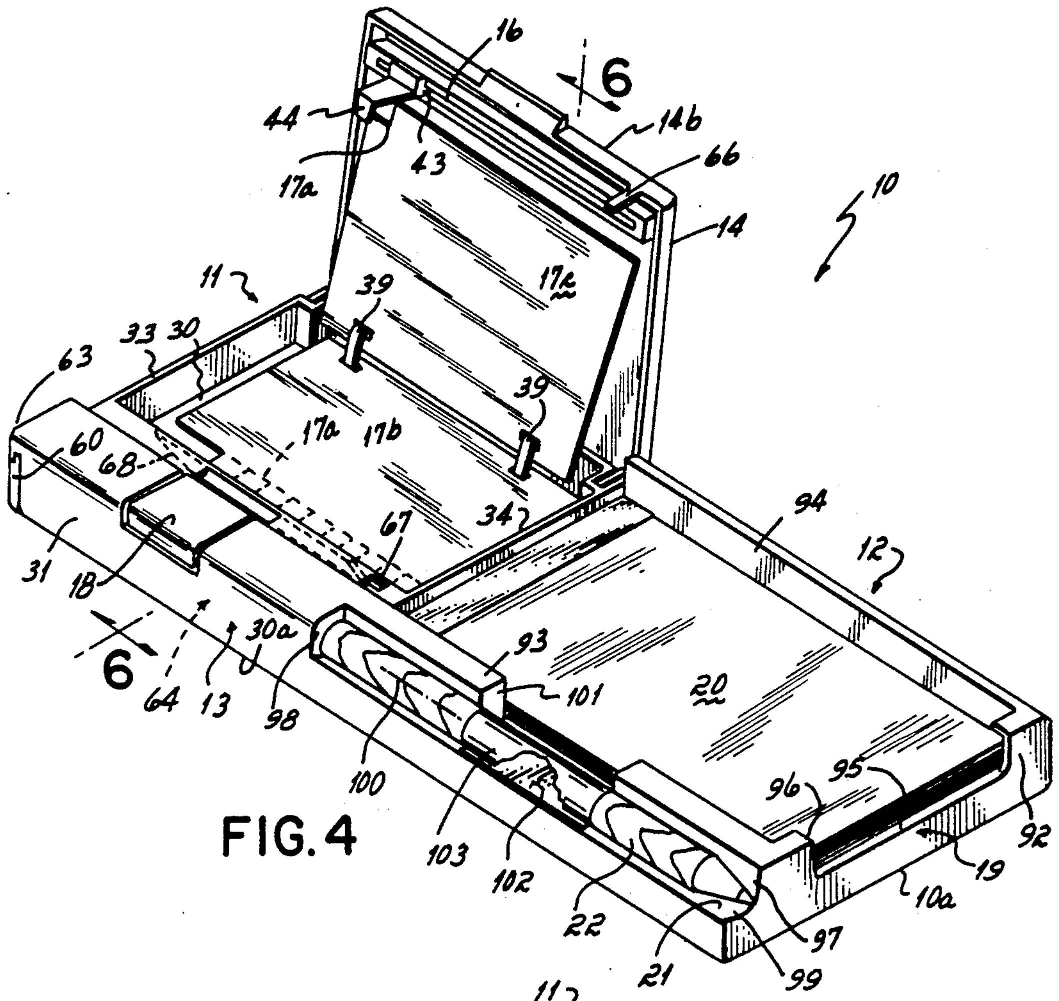
FIG. 4 is a top perspective view of the directory and tray illustrated in FIG. 1, but demounted from the vehicle's windshield and with the directory's cover open.

The directory 11, more particularly, includes a directory case 13 with a series of directory cards 17. The directory case 13 includes a floor 30, upstanding side edge walls 31, 32, and upstanding top 33 and bottom 34 edge walls. The directory 11 also includes a cover 14 connected with the case 13 on a hinge line 35, the cover 14 being movable between open and closed positions on that hinge line. The cover 14 is connected to the directory case 13 by ears 36 at its opposed ends which cooperate with hinge pin 37 carried by the directory case. The cover 14 cooperates with a cover open spring 38 connected to the case 13 which continuously spring biases the cover toward its open position shown in FIG. 6. The directory cards 17, which are of a type well known to the art and are stepped as at 17*a* or indexed relative one to the other as shown in FIG. 4 for alphabetization purposes, are held in the case 13 by curved fingers 39 fixed to the directory's floor 30.

Figure 7:
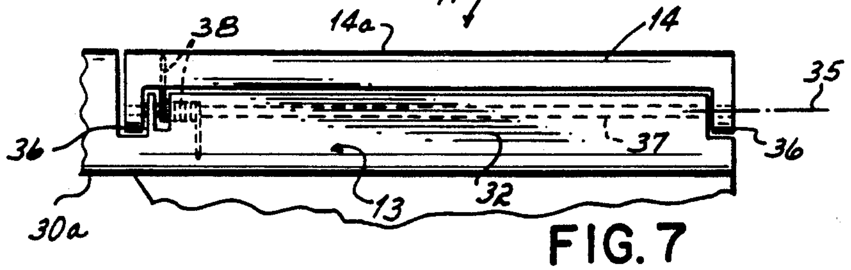
FIG. 7 is a fragmentory view taken along line 7—7 of FIG. 5.
Figure 5:
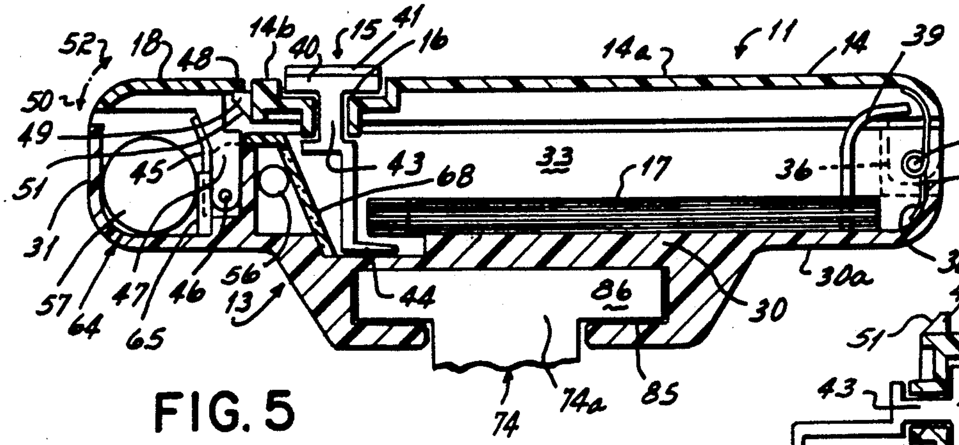
FIG. 5 is a cross-sectional view taken along line 5—5 of FIG. 2.
Figure 6:
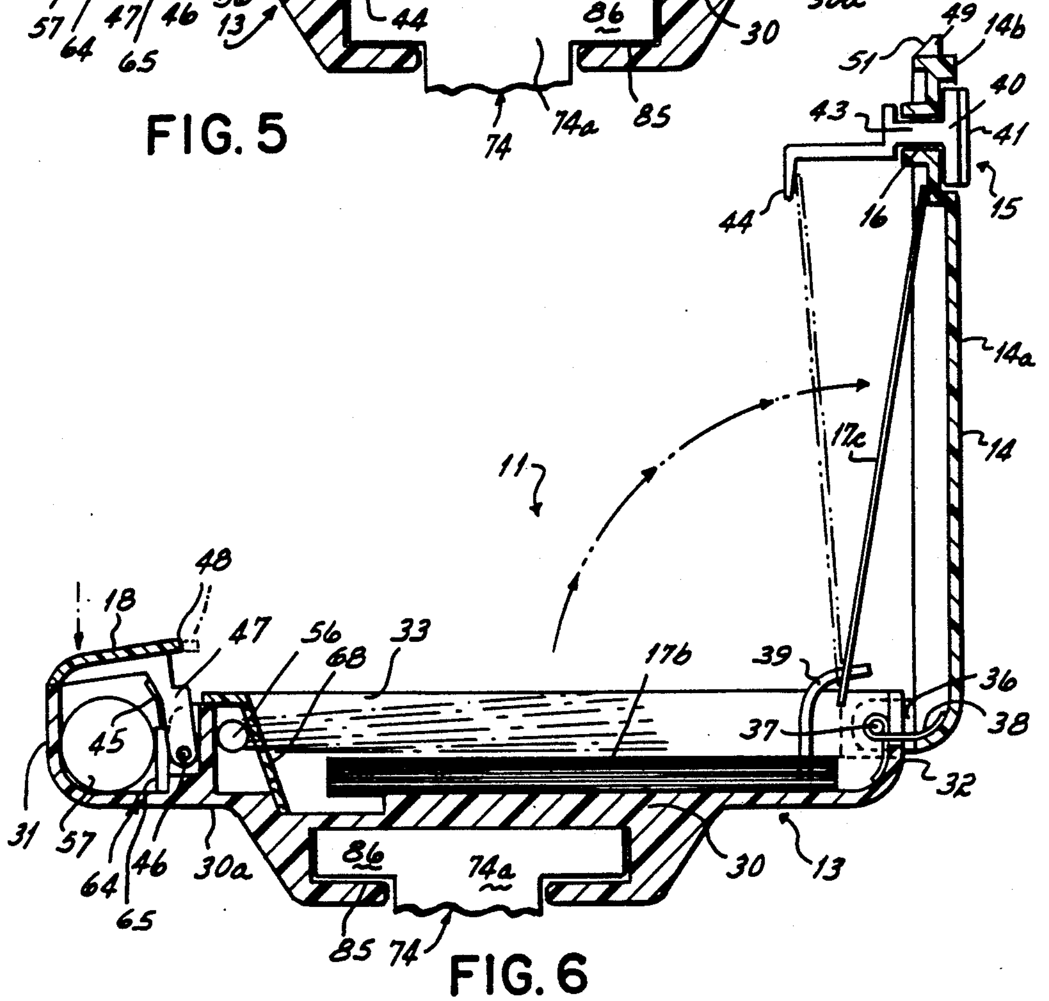
FIG. 6 is a cross-sectional view taken along line 6—6 of FIG. 4.

The card selector mechanism 15 for the directory is illustrated in FIGS. 5-7. The card selector mechanism 15 includes a selector knob 40 with indicator rib 41 that is slideable in track 16 defined in the directory's cover 14. The knob's indicator rib 41 cooperates with alphabet letters printed in area 42 on the cover's top surface 14*a* for selecting that directory card 17 desired when the cover 14 is opened. The selector knob 40 is connected via an I-shaped connector 43 to a selector finger 44 located interiorly of the directory case 13 when the cover is closed. The I-shaped connector 43 ensures that the selector knob 40 and the finger 44 will not fall out of connected relation with the directory's cover 13 when the cover is opened. The selector finger 44 cooperates with the directory cards 17 in a known fashion as the cover 14 is opened to lift up those cards 17*c* not desired which, in turn, exposes that card 17*b* that is desired with the appropriate names and telephone numbers thereon.

The cover 14 is opened and closed by a cover latch button 18 connected to the directory case 13. The latch button 18 is continuously biased toward a latch position by latch spring 45 on pivot pin 46 fixed to the floor 30, as shown in FIGS. 5 and 6. In the latch position, and as shown in FIG. 5, a button latch lip 48 on the latch button 18 is adapted to overlie mating cover latch lip 49 on the directory's cover 14 for holding the cover in its closed position. The latch button 18 is manually operable in the direction shown by phantom arrow 50 to pivot the button against its spring 45 bias to unlatch the button from the cover 14 so the cover can move to its FIG. 6 open position in response to the cover open spring. Note the cover latch button pivot axis 46 and the cover pivot axis 35 are parallel one to the other. The cover's latch lip 49, as particularly shown in FIG. 6, has a cam surface 51 on its underside so that as the cover 14 is closed that latch lip's cam surface cams the latch button 18 in the direction shown by phantom arrow 50 in FIG. 5. This action pivots the latch button 18 partially open until the cover 14 is fully closed at which point the latch button springs back in the direction shown by phantom arrow 52 so as to latch the cover in the fully closed FIG. 5 position.

Figure 8:
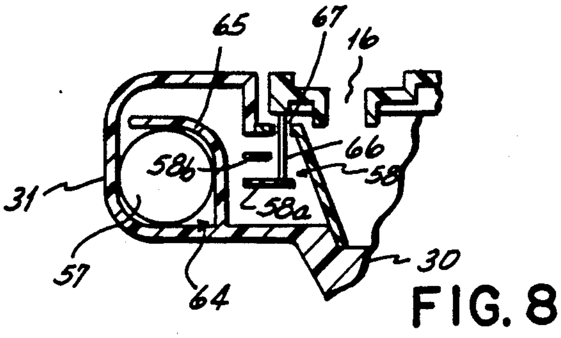
FIG. 8 is a cross-sectional view taken along line 8—8 of FIG. 2.

The directory 11 also includes a light bulb circuit 55 mounted in the case 13 for lighting the visible surface of that directory card 17*b* exposed when the cover 14 is opened. The light bulb circuit 55, which is particularly shown in FIG. 9, and the position within which it is mounted interiorly of the directory case as shown in FIGS. 6 and 8 includes two light bulbs 56 mounted parallel one with another, the light bulbs being carried in a simple electric circuit 55. The circuit 55 includes a battery pair 57 connected to one contact of each bulb 56 by lead 58*b* of a spring contact 58, the contact 58 being movable between a circuit closed position shown in FIG. 9 (at which the light bulbs 56 are activated) and a circuit opened position shown in FIG. 8 (at which the light bulbs are de-activated). The circuit 55 also includes a lead in the form of metal plate 59 attached to cover 60 for battery compartment 64. This battery compartment cover 60 cooperates with spring contact 61 connected by wire lead 62 to the other contact of each light bulb. The battery compartment cover 60 is slideably received at an end corner 63 of the directory case 13. The battery compartment 64 is defined interiorly of the directory case 13 by curved inside wall 65, and by the case's exterior side edge wall 13 and floor 30.

Figure 9:
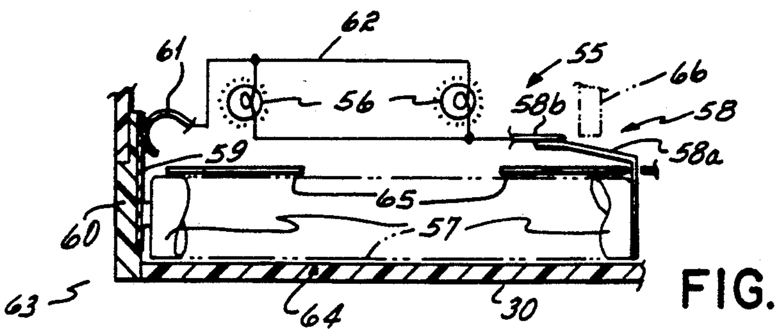
FIG. 9 is a primarily diagrammatic view illustrating a light bulb circuit mounted in the directory case.

A light actuator pin 66 is fixed to free edge 14*b* of the directory's cover 14. This light actuator pin 66 cooperates with bore 67 in the directory case 13 (as shown in FIGS. 4 and 8) to allow the electric circuit 55 to be made by spring contact 58*a* when the cover 14 is opened so the light bulbs illuminate the directory card 17*b* exposed (as shown in FIGS. 6 and 9), and to break the circuit so the light bulbs are turned off by virtue of the cover's light actuator pin depressing spring contact 58*a* away from contact 58*b* when the directory's cover is closed (compare FIGS. 8 and 9). The light bulbs 56 are protected from inadvertent contact by transparent cover lens 68 fixed to the directory case 13. Note particularly, as shown in FIGS. 5 and 6 that the light bulbs 56 are mounted adjacent a first side edge of the cards 17 opposite to a second side edge of the cards, the second edge of the cards being adjacent the cover's pivot axis 35.

Figure 3:
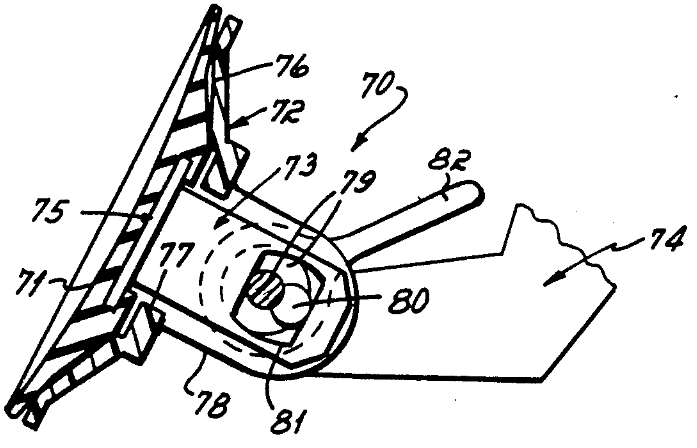
FIG. 3 is a partial cross-sectional view illustrating a suction cup-type connector device by which the directory and tray is connectable to the vehicle's windshield.

A connector device 70 is selectively connectable to and disconnectable from a desired surface so as to selectively mount and de-mount the portable directory and note pad tray 10 from that desired surface. In the embodiment illustrated, and as shown particularly in FIGS. 1 and 2, the connector device 70 is connectable to and disconnectable from the interior surface of a vehicle's windshield 23. With the connector device 70 so connected, the bottom corner edge 10*a* of the portable directory and note pad tray 10 rests on the vehicle's dashboard 24, thereby supporting the portable directory and note pad tray along its bottom edge. The connector device 70, as shown in FIGS. 2 and 3, is a commercially available suction cup actuator which generally includes a suction cup 71, a housing 72, a stand-off 73 and a mounting bracket 74. The suction cup 71 is fixed to the stand-off 73 by an annular recess and flange connection 75 received within a cavity 76 of the housing 72. Opposite the flanged connection 75, the stand-off 73 passes through an opening 77 in the housing 72 and is positioned between a pair of upstanding legs 78 fixed on either side of opening 77. The legs 78 rotatably and frictionally mount a pivot pin 79 having an eccentric cam lobe 80. The pin 79 and cam lobe 80 pass through a generally square shaped opening 81 in the stand-off 73. This pin 79 also rotatably receives on each side of stand-off 73, the mounting bracket 74. The bracket 74 is secured to the pin in a manner to permit it to pivot freely about the axis of the pin 79. Functionally, the suction cup is placed at any desired location against the windshield 23, and the lever 82 is rotated so as to locate the cam lobe 80 at the location shown i FIG. 3. This motion of the lever draws the stand-off 73 and attached suction cups 71 away from the windshield 23 to create a vacuum between the glass and the suction cup to secure it in its desired location. Thus fixed, the freely pivoting bracket 74 can pivot about pin 79 to allow the directory and tray 10 attached thereto to pivot by gravity until corner 10*a* comes into contact with supporting surface of the dashboard 24. To release the vacuum, the lever 82 is merely rotated 180° so that the cam lobe 80 is moved to the opposite side of the opening 81 thereby forcing the stand-off 73 toward the windshield 23. This motion of cam lobe forces the center area of the suction cup into contact with the glass which opens the suction cup to atmosphere.

Importantly relative to this invention, the connector device 70 is interconnected with the portable directory and note pad tray 10 by the mounting bracket 74. As best seen in FIGS. 2 and 5, the bracket 74 has a T-shaped slide plate 86 adapted to be received in a slide track 85. Specifically, the slide track 85 is fixed to the underside of the directory case 13, and the slide plate 86 is fixed to that end 74*a* of the bracket 74 not pinned to the connector device 70. Note particularly the slide track 85 is positioned on the directory floor's under surface 30*a* to define a longitudinal sliding axis 87 oriented generally parallel to the plane of the bracket 74. Note also the slide track 85 is closed at upper end 85*a*, the slide plate 86 being abutted against the closed upper end to establish the case in its connected position with the connector device 70 and in its mounted position with the vehicle's dashboard 24. The other end 85*b* of the slide track 85 is open so that the directory and note pad tray 10 can be easily disengaged from the connector device 70 and bracket 74 simply by sliding the slide plate 86 out of the slide track 85. This, in turn, permits the directory and note pad tray 10 to be placed into a businessman's briefcase or otherwise carried without the bulky connector device 70 remaining attached thereto. The bracket 74 defines an angle 88 of about 135°, i.e., midway between about 90° and about 180°. Thus, the slide plate 86 can be received in the slide track 85 with either the connector device 70 oriented beyond the top end 10a of the directory and note pad tray, as shown in solid lines in FIG. 2, or beneath the directory and note pad tray's floor 30, as shown in phantom lines in FIG. 2, so as to provide the most preferred angular position of the connector device 70 relative to the desired surface 23 or 23a on which the connector device will be mounted.

The note pad tray 12 attached to the directory 11 is particularly illustrated in FIGS. 1 and 4. The note pad tray 12 includes a tray base 19 having upstanding walls at all of the top 34, bottom 92 and both side 93, 94 edges thereof, respectively. The base 19 is adapted to receive a note pad 20 in supportive relation on its floor 95. The top wall 34 of the tray is defined by the directory case 11. A first finger gap 96 is defined in the bottom wall 92 of the tray base 19. The first finger gap 96 is cut out of the upstanding bottom wall 92 from the top surface thereof down to the tray's floor 95. This first finger gap 96 allows the individual sheets of the note pad 20 to be easily removed from the tray 12.

As particularly shown in FIG. 4, a pencil recess 21 is defined in the tray base 19 adjacent one of the tray's edge walls 93 that does not include the first finger gap 96. More particularly, this pencil recess 21 is located outboard of that side wall 93 with which it is associated, the note pad 20 being located inboard of that side wall 93. The pencil recess 21 is of a generally right angular configuration with pencil 22 being received in a curved interior corner 97 of the recess. The pencil recess 21 is provided with a closed end 98 at one end against which the pencil 22 can be abutted for appropriate positioning relative thereto, and an open end 99 at the other end to aid removal of the pencil from the recess if desired. So the pencil recess 21 is sized and configured to receive a pencil 22 in stored relation within it, the recess's longitudinal axis 100 being generally parallel to the side wall 93 to which it is adjacent.

A second finger gap 101 is provided in that tray wall 93 to which the pencil 22 is adjacent. The second finger gap 101 permits the pencil 22 to be easily removed therefrom by a user's fingers in that it allows the pencil to be grasped on opposite sides thereof. The note pad tray 12 also includes a metal plate 102 mounted in the panel recess 21, and a magnet 103 connected to the pencil 22. The magnet 103 and the metal plate 102, of course, cooperate to aid in retaining the pencil 22 in the recess 21 until it's removed therefrom by a user.

Having described in detail the preferred embodiment of our invention, what we desire to claim and protect by Letters Patent is:

1. A portable directory comprising:
a directory case with a series of directory cards,
one of a slide track and a slide plate fixed to the underside of said directory case, said plate being slidably received in said track and slidably removed from said track as desired so as to connect and disconnect said plate and said track one with the other, and
a connector device selectively mountable to and demountable from a desired surface, the other of said slide track and said slide plate being attached to said connector device, said case and said device being held in assembled relation by slidably interfitting said track and said plate, said case thereby being readily detachable from said connector device simply by sliding said plate out of said track.

2. A portable directory as claimed in claim 1, said slide track being closed at one end, said slide plate being abutted against said closed end to establish said case in its mounted position with said connector device.

3. A portable directory as claimed in claim 2, said directory comprising
a yoke arm to which said connector device is fixed at one end and to which the other of said slide track and said slide plate is fixed at the other end, said yoke arm defining an angle of between about 90° and about 180°.

4. A portable directory as claimed in claim 3, said connector device being pivotally connected to said arm, said directory case thereby being free to pivot into an abutting relation with another surface in order to locate said case in use position when said connector device is mounted on said desired surface.

5. A portable directory as claimed in claim 3, said slide plate and said slide track being structured to define a longitudinal sliding axis oriented generally parallel to the plane of said arm.

6. A portable directory as claimed in claim 1, said directory comprising
a cover connected with said case, said cover being movable between opened and closed positions,
a light bulb circuit mounted in said case for lighting the surface of that directory card exposed when said cover is opened, and
an actuator connected to said cover, said actuator cooperating with said circuit to activate said light bulb when said cover is open and to deactivate said light bulb when said case is closed.

7. A portable directory as claimed in claim 6, said directory comprising
a cover open spring connected to said case, said cover open spring continuously biasing said cover toward its opened position, and
a cover latch button connected to said case, said latch button being continuously biased toward a latch position with said cover for holding said cover in its closed position, said latch button being manually operable to move said button against its bias to unlatch said button from said cover so said cover can move to its opened position.

8. A portable directory as claimed in claim 6, said cover being mounted on a cover pivot axis, and said light bulb being mounted adjacent a first edge of said cards opposite to a second edge of said cards, said second card edge being adjacent said cover pivot axis.

9. A portable directory as claimed in claim 8, said case comprising
a battery compartment adjacent and generally parallel to said first card edge.

10. A portable directory as claimed in claim 8, said circuit comprising
a spring contact which is continually biased toward completing said circuit, said spring contact being forced to break said circuit by said actuator when said cover is closed, said light bulb thereby being activated only when said cover is opened.

11. A portable directory as claimed in claim 6, said directory comprising
a tray base having an upstanding wall at top, bottom and both side edges thereof, said base being adapted to receive a note pad in supportive relation on the floor thereof,
a first finger gap in a first one of said side and bottom edges, said first gap permitting the individual sheets of said note pad to be easily removed therefrom by a user's fingers, a pencil recess defined in said tray base adjacent one of said tray's edges that does not include said first finger gap, said recess being sized and configured to receive a pencil therein, said recess's longitudinal axis being generally parallel to that wall to which it is adjacent, a pencil adapted to be received in said pencil recess, and a second finger gap in that wall to which said pencil recess is adjacent, said second gap permitting said pencil to be easily removed therefrom by a user's fingers.

12. A portable directory as claimed in claim 11, said pad tray comprising a magnet and a metal plate, one of said magnet and said plate being incorporated in said pencil recess, and the other of said magnet and said plate being incorporated in said pencil, for retaining said pencil in said recess until removed therefrom by a user's fingers.

13. A portable directory as claimed in claim 12, said pencil recess being located outboard of that wall with which it is associated, and said note pad being located inboard of said wall.

14. A note pad tray comprising:

a tray base adapted to receive a note pad in supportive relation on a floor, said base having an upstanding first wall along one edge of said base and an upstanding second wall along another edge of said base, a first finger gap in said first wall, said first gap permitting individual sheets of said note pad to be easily removed from said base by a user's fingers, a pencil recess defined in said tray base adjacent said second wall, said recess being sized and configured to receive a pencil therein, said recess's longitudinal axis being generally parallel to said second wall, a pencil adapted to be received in said pencil recess, and a second finger gap in said second wall, said second gap permitting said pencil to be easily removed therefrom by a user's fingers.

15. A note pad tray as claimed in claim 14, said pad tray comprising a magnet and a metal plate, one of said magnet and said plate being incorporated in said pencil recess, and the other of said magnet and said plate being incorporated in said pencil, for retaining said pencil in said recess until removed therefrom by a user's fingers.

16. A note pad tray as claimed in claim 15, said pencil recess being located outboard of said second wall with which it is associated, and said note pad being located inboard of said second wall.

17. A note pad tray as claimed in claim 16, said recess being of a generally right annular configuration with said pencil being received in said corner of said right angular configuration.

18. A note pad tray as claimed in claim 14, said tray comprising:

a directory case with a series of directory cards therein, said directory case also defining a third wall of said tray base.

19. A note pad tray as claimed in claim 14, said pad tray comprising one of a slide track and a slide plate fixed to the underside of said tray, and a connector device selectively mountable to and demountable from a desired surface, and the other of said slide track and said slide plate being fixed to said connector device, said tray and said device being held in assembled relation by interfitting of said track and said plate, said tray thereby being readily detachable from said device simply by sliding said plate out of said track.

20. A note pad tray as claimed in claim 19, said pad tray comprising a yoke arm to which said connector device is fixed at one end and to which the other of said slide track and said slide plate is fixed at the other end, said yoke arm defining an angle of between about 90° and about 180°.

21. A note pad tray as claimed in claim 20 said connector device being pivotally connected to said arm, said tray thereby being free to pivot into an abutting relation with another surface in order to locate said tray in a use position when said connector device is mounted on said desired surface, said slide plate and said slide track being structured to define a longitudinal sliding axis oriented generally parallel to the plane of said arm, and said slide track being closed at one end, said slide plate being abutted against said closed end to establish said tray in its mounted position with said connector device.

* * * * *